United States Patent [19]

Mori

[11] Patent Number: 5,342,246
[45] Date of Patent: Aug. 30, 1994

[54] AUTOMATIC TRANSMISSION CONTROL SYSTEM FOR AUTOMOTIVE VEHICLE

[75] Inventor: Kyosuke Mori, Fuji, Japan
[73] Assignee: Jatco Corporation, Fuji, Japan
[21] Appl. No.: 89,527
[22] Filed: Jul. 21, 1993
[30] Foreign Application Priority Data
  Aug. 12, 1992 [JP] Japan ................. 4-236483
[51] Int. Cl.$^5$ .......................... F16H 61/00
[52] U.S. Cl. ........................ 474/1; 474/28
[58] Field of Search ........... 474/1, 12, 18, 28, 69–71; 74/860, 866, 867

[56] References Cited

U.S. PATENT DOCUMENTS 4,982,822  1/1991  Petzold et al. ............. 474/28 X
5,188,007  2/1993  Hattori et al. ............. 474/1 X

FOREIGN PATENT DOCUMENTS 1-120467  5/1989  Japan .

*Primary Examiner*—Thuy M. Bui
*Attorney, Agent, or Firm*—Foley & Lardner

[57] ABSTRACT

A control system for an automatic transmission of an automotive vehicle is provided. This control system includes a forward speed holding valve which is arranged in a hydraulic line communicating between a manual selector valve and a reverse frictional element such as a low and reverse brake, and has a first valve position which establishes fluid communication between the manual selector valve and the reverse frictional element to supply the hydraulic pressure from the manual selector valve to the reverse frictional element and a second valve position which blocks the fluid communication therebetween. When a selector lever is shifted to a reverse position while a vehicle is parked, the forward speed holding valve is controlled to assume the first valve position to engage the reverse frictional element. When the selector lever is placed in the reverse position while the vehicle is traveling forward, the forward speed holding valve is controlled to assume the second valve position to release the reverse frictional element for preventing the automatic transmission from shifting to a reverse mode when a driver mistakenly shift the selector lever to the reverse range during traveling forward.

6 Claims, 3 Drawing Sheets

FIG.2

| | C 118 | C 120 | C 124 | B 128 | B 126 | OWC 129 | GEAR RATIO | $\alpha=0.440$ $\alpha=0.493$ |
|---|---|---|---|---|---|---|---|---|
| D-RANG FIRST SPEED | | | ◯ | | {◯} | ◯ | $\dfrac{1+\alpha 2}{\alpha 2}$ | 3.027 |
| D-RANG SECOND SPEED | | | ◯ | ◯ | | | $\dfrac{\alpha 1+\alpha 2+\alpha 1\cdot\alpha 2}{\alpha 2(1+\alpha 1)}$ | 1.619 |
| D-RANG THIRD SPEED | | ◯ | ◯ | | | | 1 | 1.000 |
| D-RANG FOURTH SPEED | | ◯ | | ◯ | | | $\dfrac{1}{1+\alpha 1}$ | 0.694 |
| REVERSE SPEED | ◯ | | | | ◯ | | $-\dfrac{1}{\alpha 1}$ | -2.272 |

{◯} INDICATES ACTUATION ONLY WHEN ENGINE BRAKE IS APPLIED

AUTOMATIC TRANSMISSION CONTROL SYSTEM FOR AUTOMOTIVE VEHICLE

BACKGROUND OF THE INVENTION

1. Field of The Invention

The present invention relates generally to a control system for an automatic transmission of an automotive vehicle. More particularly, the invention is directed to an automatic transmission control system which is operable to hold forward speed even when a driver mistakenly shifts a selector lever to a reverse range while a vehicle is traveling forward.

2. Description of The Prior Art

Japanese Patent First Publication No. 1-120467 discloses a control system for an automatic transmission which is capable of preventing the transmission from shifting to a reverse mode when a selector lever is mistakenly moved to a reverse position for avoiding the transmission from breaking down. This conventional transmission control system includes a directional control valve which is arranged in a hydraulic line communicating between a manual selector valve and a reverse frictional element serving to establish the reverse mode. When a sensor signal from a vehicle speed sensor indicates that the vehicle is traveling forward, the directional control valve assumes a position which drains hydraulic pressure in the reverse frictional element to release it. Alternatively, when the vehicle is not traveling forward, the directional control valve is placed in a position which directs hydraulic pressure from the manual selector valve to the reverse frictional element to enable the reverse mode. In this manner, even when the selector lever is mistakenly moved to the reverse position, the transmission is prevented from shifting to the reverse mode.

The above prior art transmission control system, however, encounters a drawback in that the system requires an additional solenoid operated valve for switching a position of the directional control valve. This consumes valuable space and increases the number of parts, resulting in the total costs of the system being increased.

SUMMARY OF THE INVENTION

It is therefore a principal object of the present invention to avoid the disadvantages of the prior art.

It is another object of the invention to provide a control system for an automatic transmission of an automotive vehicle which is operable to hold forward speed even when a driver mistakenly shifts a selector lever to a reverse range while the vehicle is traveling forward.

According to one aspect of the present invention, there is provided a control system for an automatic transmission of an automotive vehicle which comprises a reverse frictional element of the automatic transmission serving to selectively establish a reverse mode in the automatic transmission for allowing the vehicle to move backward when a selector lever is placed in a reverse position, a first valve means having valve positions which are switched for modifying hydraulic pressure supplied to a preselected element of the automatic transmission to control given operation of the automatic transmission, a second valve means for selectively establishing and blocking fluid communication between a first pressure line connected to a pressure source and a second pressure line connected to the first valve means, a third valve means for modifying a level of hydraulic pressure supplied from the first pressure line to the second pressure line through the second valve means for switching the valve positions of the first valve means, a manual selector valve means having an R-range port which provides hydraulic pressure of a preselected level to the reverse frictional element when the selector lever is placed in the reverse position and a drain port which drains the hydraulic pressure from the reverse frictional element, a forward speed holding valve means having a first valve position communicating between a third pressure line connected to the reverse frictional element and a fourth pressure line connected to the R-range port of the manual selector valve means for supplying the hydraulic pressure to the reverse frictional element to establish the reverse mode of the automatic transmission and a second valve position communicating between the third pressure line and a fifth pressure line connected to the drain port of the manual selector valve means for draining the hydraulic pressure from the reverse frictional element to release the reverse mode, a sixth pressure line communicating between the first pressure line and the forward speed holding valve means through the second valve means when the selector lever is shifted to the reverse position, a vehicle speed sensor means for monitoring vehicle speed to provide a signal indicative thereof, a selector lever position sensor means for detecting a position of the selector lever of the automatic transmission and providing a signal indicative thereof, and a control means responsive to the signals from the vehicle speed sensor means and the selector lever position sensor means to provide a first control signal to the third valve means for modifying the hydraulic pressure in the sixth pressure line to a first level so that the forward speed holding valve means assumes the first valve position when vehicle forward speed is lower than a preselected value and the selector lever is placed in the reverse position for establishing the reverse mode of the automatic transmission and a second control signal to the third valve means for modifying the hydraulic pressure in the sixth pressure line to a second level so that the forward speed holding valve means assumes the second valve position when vehicle forward speed is higher than the preselected value and the selector lever is shifted to the reverse position for preventing the automatic transmission from shifting to the reverse mode when the vehicle is traveling forward at a speed higher than the preselected value.

In the preferred mode, the first valve means may be arranged to modify the hydraulic pressure supplied to lock-up clutch means.

The first valve means may be provided with a lock-up clutch control valve. The third valve means may be provided with a solenoid operated valve which modifies the hydraulic pressure supplied to the lock-up clutch control valve for controlling a pressure difference between an apply chamber and a release chamber of a torque converter of the automatic transmission.

Additionally, the forward speed holding valve means may be arranged to receive the hydraulic pressure supplied through the sixth pressure line and hydraulic pressure supplied from a constant pressure regulating valve, the forward speed holding valve means being switched between the first and second valve positions dependent upon a balance between the magnitudes of the hydraulic pressures supplied from sixth pressure line and the constant pressure regulating valve.

BRIEF DESCRIPTION OF THE DRAWINGS

The present invention will be understood more fully from the detailed description given hereinbelow and from the accompanying drawings of the preferred embodiment of the invention. However, the drawings are not intend to imply limitation of the invention to specific embodiment, but are for explanation and understanding only.

In the drawings:

FIG. 2 is a table which shows the relations between gear ratios and operative conditions of elements of an automatic transmission.

DESCRIPTION OF THE PREFERRED EMBODIMENT

Figure 1:
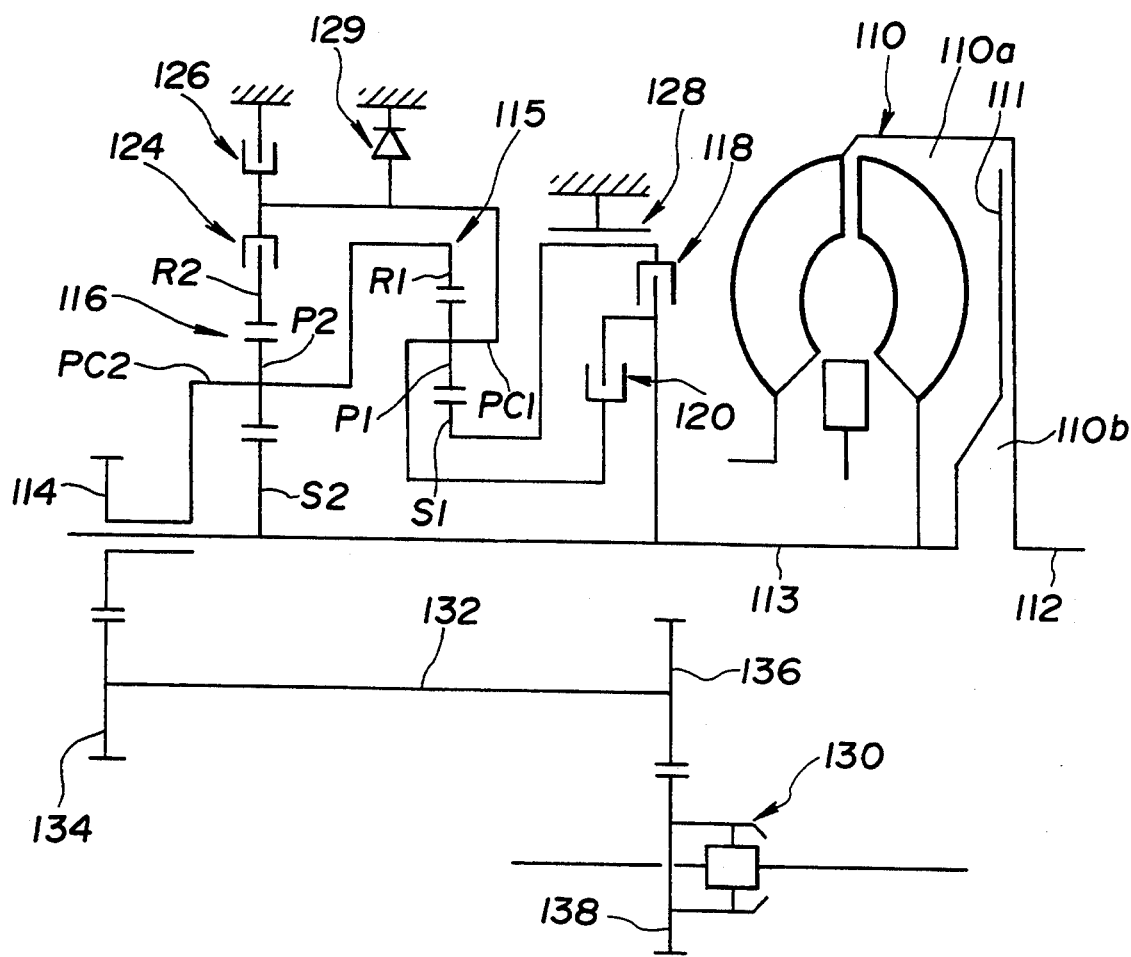
FIG. 1 is a schematic view which shows an essential part of a gear train of an automatic transmission.

Referring now to the drawings, particularly to FIG. 1, wherein like number refer to like parts in several views, there is shown a power train of an automatic transmission with overdrive which provides four forward speeds and one reverse speed. This power train includes generally an input shaft 113 to which engine torque is transmitted from an engine output shaft 112 through a torque converter 110, an output gear 114 transmitting the engine torque to a final drive unit 130, a first planetary gear set 115, a second planetary gear set 116, a reverse clutch 118, a high clutch 120, a low clutch 124, a low and reverse brake 126, a band brake 128, and a one way clutch 129. The torque converter 110 includes therein a lock-up clutch 111 which defines an apply chamber 110a and a release chamber 110b. When hydraulic pressure in the apply chamber 110a becomes greater than that in the release chamber 11b, it will cause the lock-up clutch 111 to be engaged. Alternatively, when the hydraulic pressure in the release chamber 110b becomes greater than that in the apply chamber 110a, the lock-up clutch is released. The first planetary gear set 115 includes a sun gear S1, an internal gear R1, and a carrier PC1 which supports a pinion gear P1 meshing with both the sun gear and the internal gear simultaneously. Likewise, the second planetary gear set 116 includes a sun gear S2, an internal gear R2, and a carrier PC2 which supports a pinion gear P2 meshing with both the sun gear S2 and the internal gear R2 simultaneously. The carrier PC1 is engageable with the input shaft 113 through the high clutch 120. The sun gear S1 is also engageable with the input shaft 113 through the reverse clutch 118. The carrier PC1 is also engageable with the internal gear R2 through the low clutch 124. The sun gear S2 is constantly connected to the input shaft 113. Additionally, the internal gear R1 and the carrier PC2 are connected to the output shaft 114 constantly. The low and reverse brake 126 is operable to hold the carrier PC1 from rotating. The low one way clutch 129 is arranged to allow the carrier PC1 to rotate in a normal direction (i.e., the same direction as the engine output shaft 112), while it restricts reverse rotation thereof. The output gear 114 meshes with a gear 134 on a counter shaft 132 extending parallel to the input shaft 113. A gear 136 on the other end of the counter shaft 132 meshes with a final gear 138 of the final drive unit 130.

The above mentioned automatic transmission may selectively operate frictional elements such as the clutches 118, 120, and 124, and the brakes 126 and 128 according to a given schedule to control rotational conditions of the elements (S1, S2, R1, R2, PC1, and PC2) of the first and second planetary gear sets 115 and 116 respectively, thereby changing a rotational ratio of the input shaft 113 to the output shaft 114. FIG. 2 shows a table which represents the relations between gear ratios and operative conditions of the clutches 118, 120, 124, and 129, the brakes 128, 126 which provides four forward speeds and one reverse. In FIG. 2, the symbol "◯" indicates an element being operated, $\alpha 1$ and $\alpha 2$ respectively indicate ratios of the number of teeth of the sun gears S1 and S2 to those of the internal gears R1 and R2. Additionally, the gear ratio shows a rotational ratio of the input shaft 113 to the output shaft 114.

Figure 3:
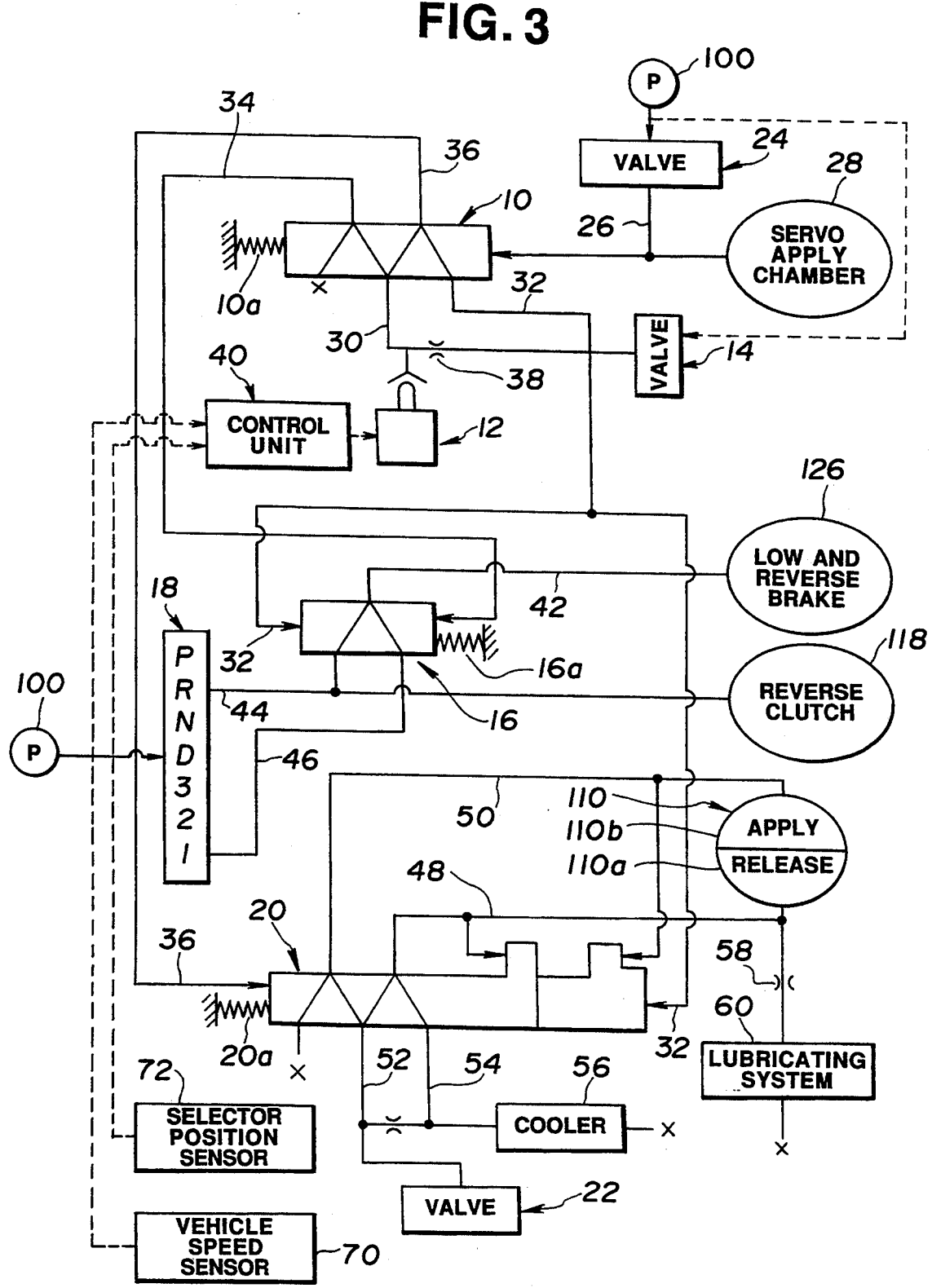
FIG. 3 is a circuit diagram which shows a hydraulic system for controlling operation of an automatic transmission according to the present invention.

Referring to FIG. 3, there is shown an essential part of a hydraulic circuit for controlling operation of the automatic transmission according to the present invention.

The shown hydraulic circuit includes a directional control valve 10, a solenoid operated valve 12, a constant pressure regulating valve 14, a forward speed holding valve 16, a manual selector valve 18, a lock-up clutch control valve 20, a torque converter supply pressure regulating valve 22, and a shift valve 24.

The shift valve 24 provides controlled hydraulic pressure to a seventh hydraulic pressure line 26 at second, third, and fourth speeds, and drains the hydraulic pressure from the seventh hydraulic pressure line 26 at first speed. The seventh hydraulic pressure line 26 is communicated with a servo apply chamber 28 which controls the operation of the band brake 128, and also communicated with the directional control valve 10 to provide a pressure signal thereto for actuation.

The directional control valve 10 is activated dependent upon a balance between the hydraulic pressure from the seventh hydraulic pressure line 26 and spring force of a spring 10a to selectively establish fluid communication among a first hydraulic pressure line 30, a constant hydraulic pressure line 32, a sixth hydraulic pressure line 34, and a second hydraulic pressure line 36 in the following manner. When no hydraulic pressure is supplied to the seventh hydraulic pressure line 26, the directional control valve 10 establishes the fluid communications between the first hydraulic pressure line 30 and the sixth hydraulic pressure line 34 and between the constant hydraulic pressure line 32 and the second hydraulic pressure line 36. Alternatively, when the hydraulic pressure in the seventh hydraulic pressure line 26 builds up, it will cause the directional control valve 10 to be switched to a position which drains pressure in the sixth hydraulic pressure line 34 and establishes the fluid communication between the first hydraulic pressure line 30 and the second hydraulic pressure line 36.

The constant pressure regulating valve 14 is arranged to modify line pressure supplied form the pressure source 100 to output hydraulic pressure of a constant level to the constant hydraulic pressure line 32. The solenoid operated valve is responsive to a control signal having a preselected duty ratio from an electronic control unit 40 to selectively open and close a drain port of the first hydraulic pressure line 30 for modifying hydraulic pressure therein. The first hydraulic pressure line is communicated with the constant hydraulic pressure line 32 through an orifice 38.

The forward speed holding valve 16 is arranged to switch its position dependent upon a balance between the hydraulic pressure from the constant hydraulic pressure line 32 and spring force of a spring 16a plus the hydraulic pressure from the sixth hydraulic pressure line 34 which act in a direction opposite the hydraulic pressure in the constant hydraulic pressure line 32. When the hydraulic pressure in the sixth hydraulic pressure line 34 is a relatively high level, fluid communication is established between a third hydraulic pressure line 42 and a fourth hydraulic pressure line 44. Alternatively, when the hydraulic pressure in the sixth hydraulic pressure line 34 is a relatively low level, fluid communication is established between the third hydraulic pressure line 42 and a fifth hydraulic pressure line 46.

The third hydraulic pressure line 42 is communicated with the low and reverse brake 126. The fourth hydraulic pressure line 44 is communicated with an R-range port of the manual selector valve 18 so that line pressure supplied from a hydraulic pressure source 100 is directed to the fourth hydraulic pressure line 44 when a driver shifts a selector lever (not shown) to a reverse (R) range. The fourth hydraulic pressure line 44 is also communicated with the reverse clutch 118. The manual selector valve further has a first speed port communicating with the fifth hydraulic pressure line 46 so that the line pressure is supplied to the fifth hydraulic pressure line 46 only when the selector lever is placed in a first-speed locked range (1) and the pressure therein is drained in ranges other than the first-speed locked range.

The lock-up clutch control valve 20 is arranged to switch its position dependent upon a balance between first force acting in a right direction, as viewed in the drawing, which includes spring force of a spring 20a and pressures in the second hydraulic pressure line 36 and a hydraulic pressure line 48 and second force acting in a left direction including pressures in the constant hydraulic pressure line 32 and the a hydraulic pressure line 50. When the pressure in the second hydraulic pressure line 36 (i.e., the first force) is relatively low, the pressure in the hydraulic pressure line 50 is drained and fluid communication between the hydraulic pressure line 48 and a hydraulic pressure line 52 is established. Alternatively, when the pressure in the second hydraulic pressure line 36 is relatively high, the hydraulic pressure line 50 is fluidly communicated with the hydraulic pressure line 52 with fluid communication between the hydraulic pressure line 48 and a hydraulic pressure line 54 which is connected to a cooler 56.

To the hydraulic pressure line 52, torque converter supply pressure of a constant level is supplied form the torque converter supply pressure regulating valve 22. The hydraulic pressure line 48 is communicated with a lubricating circuit 60 through an orifice 58.

The electronic control unit 40 receives a vehicle speed indicative signal from a vehicle speed sensor 70, a selector position indicative signal from a selector position sensor 72 which represents a position of the selector lever, or one of seven positions: P (Park), R (Reverse), N (neutral), D (Drive), 3 (third-speed locked), 2 (second-speed locked), and 1 (first-speed locked).

In operation, when a vehicle is traveling forward at the first gear ratio (i.e., first speed), no pressure is, as mentioned above, supplied to the seventh hydraulic pressure line 26 causing the directional control valve 10 to assume a position which establishes the fluid communications between the first hydraulic pressure line 30 and the sixth hydraulic pressure line 34 and between the constant hydraulic pressure line 32 and the second hydraulic pressure line 36. At this time, the electronic control unit 40 provides a control signal having a duty ratio of 100 to the solenoid operated valve 12 so that most of the hydraulic pressure in the first hydraulic line 30 is drained to reduce pressure therein to a minimum level, or about zero. The forward speed holding valve 16 is therefore placed in a position which establishes the fluid communication between the fifth hydraulic pressure line 46 and the third hydraulic pressure line 42. Accordingly, when the selector lever is shafted to the first-speed locked position (1), the line pressure is supplied to the low and reverse brake 126 through the third and fifth hydraulic pressure lines 42 and 46. Additionally, the directional control valve 10 is placed in a position establishing the fluid communication between the constant hydraulic pressure line 32 and the second hydraulic pressure line 36 and thus pressure of a constant level acts on the lock-up clutch control valve 20 through the second hydraulic pressure line 36. The lock-up clutch control valve 20 is then placed in a position which establishes the fluid communications between the hydraulic pressure lines 50 and 52 and between the hydraulic pressure lines 54 and 48. Therefore, the torque converter supply pressure from the torque converter supply pressure regulating valve 22 is transmitted, to the release chamber 110b of the torque converter 110 through the hydraulic pressure lines 52 and 50, to the hydraulic pressure line 48 through the apply chamber 110a, then to the cooler 56 through the hydraulic pressure line 54, thereby releasing the lock-up clutch 111 of the torque converter 110.

When the transmission upshifts to more than the second gear ratio (i.e., second speed), the shift valve 24 provides controlled pressure to the seventh hydraulic pressure line 26. This causes the directional control valve 10 to change its position which drains the pressure in the sixth hydraulic pressure line 34 and establishes the fluid communication between the first and second hydraulic pressure lines 30 and 36. With the pressure in the sixth hydraulic pressure line 34 being drained, the forward speed holding valve 16 is, as already mentioned, placed in the position which establishes the fluid communication between the fifth hydraulic pressure line 46 and the third hydraulic pressure line 42. Additionally, the first hydraulic pressure line 30 is communicated with the second hydraulic pressure line 36 so that the pressure which is controlled by the solenoid operated valve 12 acts on the lock-up clutch control valve 20. Accordingly, as the pressure in the first hydraulic pressure line 30 is lowered by the solenoid operated valve 12 according to a duty ratio of the control signal from the electronic control unit 40, the lock-up clutch control valve 20 drains the pressure in the hydraulic pressure line 50 and direct the pressure in the hydraulic pressure line 52 to the hydraulic pressure line 48. On the other hand, the fluid communication between the hydraulic pressure line 48 and the hydraulic pressure line 54 is blocked gradually. Therefore, as the pressure in the first hydraulic pressure line 30 which is modified by the solenoid operated valve 12 is reduced, the pressure in the release chamber 110b of the torque converter 110 is decreased, thereby engaging the lock-up clutch 111 gradually. Accordingly, when a pressure level in the first hydraulic pressure line 30 is modified to reach the minimum level, the lock-up clutch control valve 20 drains the pressure in the hydraulic pressure line 50 completely and direct the pressure in the hydraulic pressure line 52 to the hydraulic pressure lines 48, thereby causing the pressure in the release chamber 110b of the torque converter 110 to be drained fully while elevating pressure in the apply chamber 110a so that the lock-up clutch 111 is engaged completely. It will be appreciated that the operation of the lock-up clutch is controlled by the activity of the solenoid operated valve 12.

When the selector lever is shifted to place the manual selector valve 18 in the R-range while the vehicle is parked, it will provide the line pressure to the fourth hydraulic pressure line 44. The shift valve 24 provides no pressure to the seventh hydraulic pressure line 26 so that the directional control valve 10 communicates between the first and sixth hydraulic pressure lines 30 and 34. At this time, the electronic control unit 40 outputs a control signal having a duty ratio of zero to the solenoid operated valve 12. The solenoid valve 12 then closes the drain port so that the pressure in the first hydraulic pressure line 30 is regulated to the same level as in the constant hydraulic pressure line 32. The pressure thus regulated in the first hydraulic pressure line 30 then acts on the forward speed holding valve 16. Therefore, the pressure in the constant hydraulic pressure line 32 and the pressure in the sixth hydraulic pressure line 34 act on the forward speed holding valve 16 in opposite directions so that the forward speed holding valve is urged by the spring force of the spring 16a to the position where the third and fourth hydraulic pressure lines 42 and 44 are communicated with each other. Thus, the manual selector valve 18 provides the line pressure to the low and reverse brake 128 and the reverse clutch 118 through the fourth hydraulic pressure line 44 to engage them respectively so that the automatic transmission establishes the reverse mode which allows the vehicle to move backward.

However, when the selector lever is mistakenly moved to shift the manual selector valve 18 to the R-range while the vehicle is traveling forward, the electronic control unit 40 controls the low and reverse brake 126 in the following manner. When a sensor signal from the vehicle speed sensor 70 indicating that the vehicle is traveling forward at a speed greater than a preselected value and a sensor signal from the selector position sensor 72 indicating that the selector lever is positioned in the R-range are input to the electronic control unit 40, it provides a control signal having a duty ratio of 100% to the solenoid operated valve 12. The solenoid operated valve 12 then opens the drain port of the first hydraulic pressure line 30 to reduce a pressure level therein to the minimum level. The pressure acting on the forward speed holding valve 16 through the sixth hydraulic pressure line 34 is then reduced to the minimum level so that the forward speed holding valve 16 establishes the fluid communication between the third and fifth hydraulic pressure lines 42 and 46 in response to the pressure in the constant hydraulic pressure line 32. Thus, the pressure supply from the R-port of the manual selector valve 18 to the low and reverse brake 126 through the fourth hydraulic pressure line 44 is blocked. Additionally, the pressure in the low and reverse brake 126 is drained through the third hydraulic pressure line 42, the forward speed holding valve 16, the fifth hydraulic pressure line 46 and the manual selector valve 18. Therefore, with the above arrangements, even when the driver mistakenly shifts the selector lever to the R-range during traveling forward, the fluid communication between the low and reverse brake 126 and the R-port of the manual selector valve 18 is blocked by the forward speed holding valve 16 to prevent the automatic transmission from shifting from the forward gear ratio to the reverse ratio.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, the above embodiment is not limited to an arrangement wherein the solenoid operated valve 12 for lock-up clutch control is used to switch a position of the forward speed holding valve 16 and it is possible to utilize a gear shift timing control valve for controlling the forward speed holding valve.

What is claimed is:

1. A control system for an automatic transmission of an automotive vehicle comprising:

a reverse frictional element of the automatic transmission, said reverse frictional element serving to selectively establish a reverse mode in the automatic transmission for allowing the vehicle to move backward when a selector lever is placed in a reverse position;

first valve means having valve positions which are switched for modifying hydraulic pressure supplied to a preselected element of the automatic transmission to control given operation of the automatic transmission;

second valve means for selectively establishing and blocking fluid communication between a first pressure line connected to a pressure source and a second pressure line connected to said first valve means;

third valve means for modifying a level of hydraulic pressure supplied from the first pressure line to the second pressure line through said second valve means for switching the valve positions of said first valve means;

manual selector valve means having an R-range port which provides hydraulic pressure of a preselected level to said reverse frictional element when the selector lever is placed in the reverse position and a drain port which drains the hydraulic pressure from said reverse frictional element;

forward speed holding valve means having a first valve position communicating between a third pressure line connected to the reverse frictional element and a fourth pressure line connected to the R-range port of said manual selector valve means for supplying the hydraulic pressure to said reverse frictional element to establish the reverse mode of the automatic transmission and a second valve position communicating between the third pressure line and a fifth pressure line connected to the drain port of said manual selector valve means for draining the hydraulic pressure from said reverse frictional element to release the reverse mode;

a sixth pressure line communicating between the first pressure line and said forward speed holding valve means through said second valve means when the selector lever is shifted to the reverse position;

vehicle speed sensor means for monitoring vehicle speed to provide a signal indicative thereof;

selector lever position sensor means for detecting a position of the selector lever of the automatic transmission and providing a signal indicative thereof; and control means responsive to the signals from said vehicle speed sensor means and said selector lever position sensor means to provide a first control signal to said third valve means for modifying the hydraulic pressure in said sixth pressure line to a first level so that said forward speed holding valve means assumes the first valve position when vehicle forward speed is lower than a preselected value and the selector lever is placed in the reverse position for establishing the reverse mode of the automatic transmission and a second control signal to said third valve means for modifying the hydraulic pressure in said sixth pressure line to a second level so that said forward speed holding valve means assumes the second valve position when vehicle forward speed is higher than the preselected value and the selector lever is shifted to the reverse position for preventing the automatic transmission from shifting to the reverse mode when the vehicle is traveling forward at a speed higher than the preselected value.

2. A control system as set forth in claim 1, wherein said first valve means is adapted for modifying the hydraulic pressure supplied to lock-up clutch means.

3. A control system as set forth in claim 2, wherein said first valve means is a lock-up clutch control valve, said third valve means being provided with a solenoid operated valve which modifies the hydraulic pressure supplied to the lock-up clutch control valve for controlling a pressure difference between an apply chamber and a release chamber of a torque converter of the automatic transmission.

4. A control system as set forth in claim 1, wherein said second valve means assumes a valve position which communicates between the first pressure line and the second pressure line in response to hydraulic pressure provided when the automatic transmission establishes a forward gear ratio which exceeds at least a preselected forward gear ratio.

5. A control valve as set forth in claim 4, wherein said second valve means assumes a valve position which communicates between the first pressure line and the sixth pressure line when said manual selector valve means is placed in a position corresponding to the reverse position of the selector lever.

6. A control valve as set forth in claim 1, wherein said forward speed holding valve means receives the hydraulic pressure supplied through the sixth pressure line and hydraulic pressure supplied from a constant pressure regulating valve, said forward speed holding valve means being switched between the first and second valve positions dependent upon a balance between the magnitudes of the hydraulic pressures supplied from sixth pressure line and the constant pressure regulating valve.

* * * * *